United States Patent
Benisty et al.

(10) Patent No.: US 11,681,634 B2
(45) Date of Patent: Jun. 20, 2023

(54) DIRECT HOST ACCESS TO STORAGE DEVICE MEMORY SPACE

(71) Applicant: Western Digital Technologies, Inc., San Jose, CA (US)

(72) Inventors: Shay Benisty, Beer Sheva (IL); Alon Marcu, Tel-Mond (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/142,027

(22) Filed: Jan. 5, 2021

(65) Prior Publication Data
US 2021/0124692 A1 Apr. 29, 2021

Related U.S. Application Data

(62) Division of application No. 15/847,671, filed on Dec. 19, 2017, now Pat. No. 10,929,309.

(51) Int. Cl.
*G06F 3/06* (2006.01)
*G06F 12/1081* (2016.01)
*G06F 13/42* (2006.01)

(52) U.S. Cl.
CPC ........ *G06F 12/1081* (2013.01); *G06F 3/0611* (2013.01); *G06F 3/0635* (2013.01);
(Continued)

(58) Field of Classification Search
CPC .... G06F 3/0635; G06F 3/0659; G06F 3/0679; G06F 3/0611; G06F 13/4022; G06F 13/4282; G06F 12/1081
See application file for complete search history.

(56) References Cited

U.S. PATENT DOCUMENTS 7,257,714 B1 8/2007 Shen
7,475,174 B2 1/2009 Chow et al.
(Continued)

FOREIGN PATENT DOCUMENTS

CN 101515472 A 8/2009
CN 102810068 A 12/2012
(Continued)

OTHER PUBLICATIONS

PLX Technology: Press Release: PLX Technology Expands PCI Express Gen3 Switch Family: Three New Multi-Root Devices Offer Four On-Chip DMA Engines; Multiple NT, SSC, Ports; dated Sep. 6, 2011; 3 total pages.
(Continued)

*Primary Examiner* — Ernest Unelus
(74) *Attorney, Agent, or Firm* — Patterson + Sheridan, LLP; Steven H. VerSteeg

(57) ABSTRACT

Apparatuses and methods of directly accessing a memory space of a storage device by a host are provided. In one embodiment, a method of driverless access of a non-volatile memory of a non-volatile memory device by a host includes initializing a PCIe memory space mapping a portion of the non-volatile memory of the non-volatile memory device to a host memory space. The non-volatile memory is mapped through a PCIe link between the host and the non-volatile memory device. Load/store commands are sent to the PCIe memory space for driverless access. The method further includes negotiating an alignment size of the minimum transaction packet size to complete the load/store commands.

20 Claims, 8 Drawing Sheets

(52) U.S. Cl.
CPC .......... *G06F 3/0659* (2013.01); *G06F 3/0679* (2013.01); *G06F 13/4282* (2013.01); *G06F 2213/0026* (2013.01)

(56) References Cited

U.S. PATENT DOCUMENTS

| | | |
|---|---|---|
| 7,624,089 B2 | 11/2009 | Diener |
| 8,949,486 B1 | 2/2015 | Kagan et al. |
| 2007/0180328 A1 | 8/2007 | Cornwell et al. |
| 2009/0292861 A1 | 11/2009 | Kanevsky et al. |
| 2013/0024646 A1 | 1/2013 | Liu et al. |
| 2013/0212321 A1 | 8/2013 | Talagala et al. |
| 2013/0289927 A1 | 10/2013 | Smith et al. |
| 2013/0343131 A1 | 12/2013 | Wu et al. |
| 2014/0047166 A1 | 2/2014 | Asnaashari et al. |
| 2014/0101370 A1 | 4/2014 | Chu et al. |
| 2014/0122765 A1 | 5/2014 | Subramaniyan et al. |
| 2014/0237156 A1 | 8/2014 | Regula et al. |
| 2014/0289462 A9 | 9/2014 | Malwankar |
| 2015/0006663 A1 | 1/2015 | Huang |
| 2017/0052916 A1* | 2/2017 | Kollu ............... G06F 13/4022 |
| 2017/0139849 A1 | 5/2017 | Bandic et al. |

FOREIGN PATENT DOCUMENTS

| | | |
|---|---|---|
| CN | 102855193 A | 1/2013 |
| CN | 103838676 A | 6/2014 |
| CN | 105005536 A | 10/2015 |
| CN | 105164980 A | 12/2015 |

OTHER PUBLICATIONS

Wikipedia, The Free Encyclopedia; Aperture (computer memory); dated Oct. 18, 2016; 1 page.

Flash Memory Summit; "NVMeTM SSD with Persistent Memory Region"; https://www.flashmemorysummit.com/English/Collaterals/Proceedings/2017/20170810_FM31_Chanda.pdf; Santa Clara, CA, Aug. 2017 (10 pages).

* cited by examiner

DIRECT HOST ACCESS TO STORAGE DEVICE MEMORY SPACE

CROSS-REFERENCE TO RELATED APPLICATIONS

This application is a divisional of co-pending U.S. patent application Ser. No. 15/847,671, filed Dec. 19, 2017, which is herein incorporated by reference.

BACKGROUND OF THE DISCLOSURE

Field of the Disclosure

Embodiments of the present disclosure generally relate to apparatuses and methods of directly accessing a memory space of a storage device by a host.

Description of the Related Art

A computer system's memory can be composed of main memory, such as volatile memory, and secondary memory or memory storage, such as non-volatile memory. Communication between memory storage and a central processing unit (CPU) of a computer is defined by the command set and protocols specifying instructions for read/write access and by the host programming interface upon which those commands are transmitted. Communication protocols have been defined to enable faster adoption and interoperability of memory storage devices connected to a host over a bus, such as a peripheral computer expansion bus.

The CPU accesses data from a memory storage device through communication via various physical layers, link layers, host interface layers, memory management layers, data-path layers, and flash translation layers between the host and the memory storage device. The time latency for each communication between the host and memory storage device adds significant amount of time to the data fetch/execute cycle time.

Therefore, there is a need for improved apparatuses and methods for accessing a memory space of a memory storage device by a host.

SUMMARY OF THE DISCLOSURE

Apparatuses and methods of directly accessing a memory space of a storage device by a host are provided. In one embodiment, a method of driverless access of a non-volatile memory of a non-volatile memory device by a host includes initializing a PCIe memory space mapping a portion of the non-volatile memory of the non-volatile memory device to a host memory space. The non-volatile memory is mapped through a PCIe link between the host and the non-volatile memory device. Load/store commands are sent to the PCIe memory space for driverless access. The method further includes negotiating an alignment size of the minimum transaction packet size to complete the load/store commands.

In another embodiment, a method of driver access and driverless access of a non-volatile memory of a non-volatile memory device by a host includes initializing a PCIe memory space mapping a portion of the non-volatile memory of the non-volatile memory device to a host memory space. The non-volatile memory is mapped through a PCIe link between the host and the non-volatile memory device. A PCIe configuration space is also initialized with configuration information of the storage device. Load/store commands are sent to the PCIe memory space for driverless access. Read/write commands are sent to an NVMe driver of the host for driver access utilizing the configuration information of the storage device.

In yet another embodiment, a method of accessing a non-volatile memory of a non-volatile memory device by a host includes establishing a first PCIe link between the host and the non-volatile memory device and a second PCIe link between the host and a peripheral device. A PCIe memory space mapping one or more portions of the non-volatile memory of the non-volatile memory device to a host memory space is initialized through the first PCIe link. Data is routed from the peripheral device through the second PCIe link to the first PCIe link by addressing the PCIe memory space mapping the one or more portion of the non-volatile memory of the non-volatile memory device.

In one embodiment, a computer system includes a host means and a non-volatile memory device. The host means includes a host memory space. The non-volatile memory device includes a non-volatile storage memory and a controller coupled to the non-volatile storage memory. The host means is configured to dynamically activate and deactivate one or more portions of the non-volatile storage memory mapped to the host memory space for direct access by the host means.

In one embodiment, a non-volatile memory device includes a link interface, a non-volatile memory, and a controller coupled to the non-volatile memory. The link interface is configured to be linked to a host. The controller is configured to receive a driverless access command and route the driverless access command to bypass a host interface protocol layer. The controller is further configured to receive a driver access command and route the driver access command to the host interface protocol layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

Embodiments of the present disclosure generally relate to apparatuses and methods of directly accessing a memory space of a storage device by a host. A host may access the memory space, such as a NAND flash memory space, by both driverless commands and driver commands. Driverless access and driver access may be provided to a computer device, a computer system, or a computer network or may be provided to any peripheral device connected thereto.

Figure 1A:
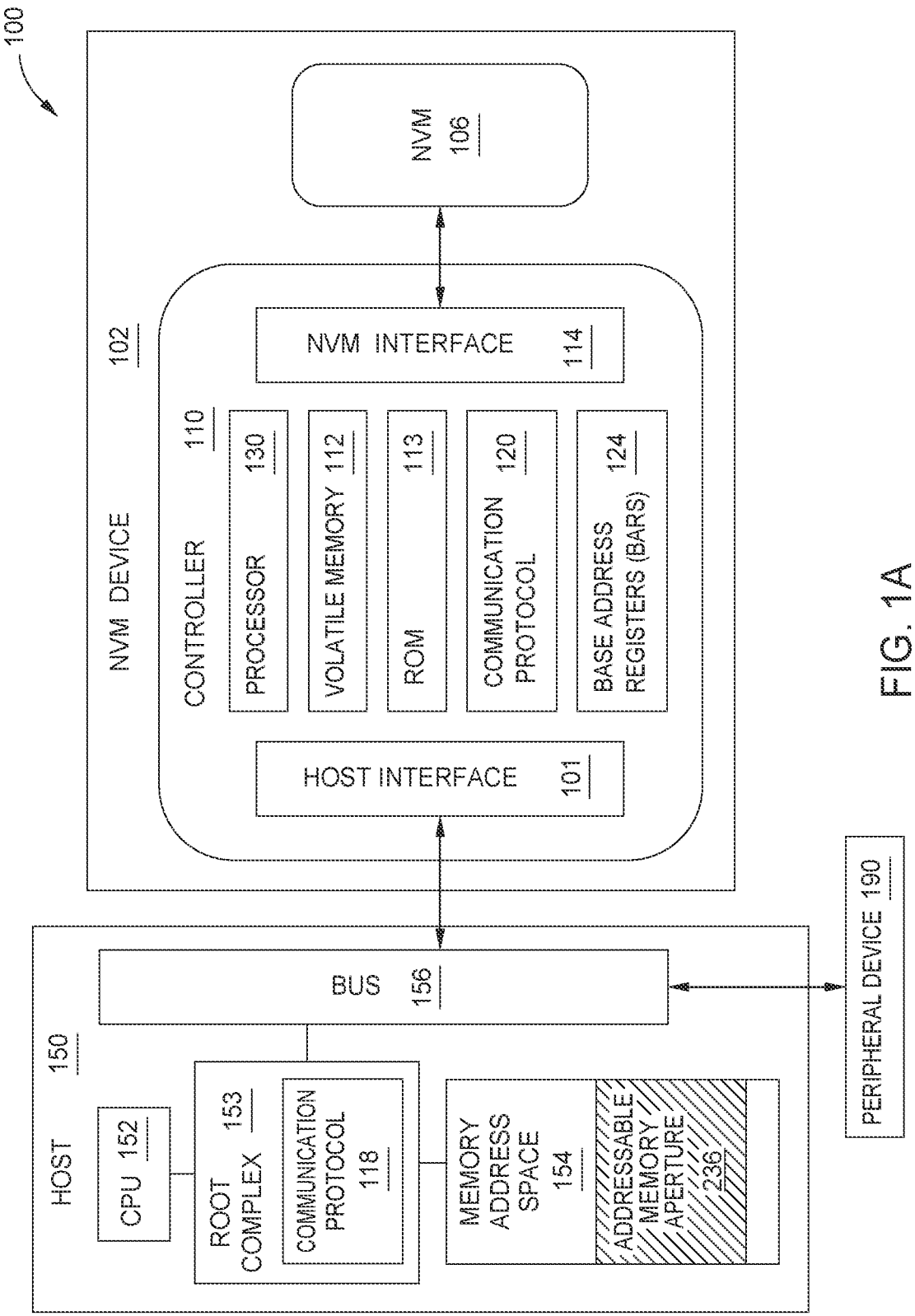
FIG. 1A is a schematic illustration of one embodiment of a system including an initiator or host and a non-volatile memory device for the host.

FIG. 1A is a schematic illustration of one embodiment of a system 100 including an initiator or host 150 and a NVM device 102, such as a SSD, for host 150. Host 150 may utilize a NVM 106 included in NVM device 102 to write and to read data, such as for memory storage, main memory, cache memory, backup memory, or redundant memory. NVM device 102 may be an internal storage drive, such as a notebook hard drive or a desktop hard drive. NVM device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. NVM device 102 may take the form of an embedded mass storage device, such as an eSD/eMMC embedded flash drive, embedded in host 150. NVM device 102 may also be any other type of internal storage device, removable storage device, embedded storage device, external storage device, or network storage device.

Host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 150 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 150 includes a central processing unit (CPU) 152 connected through a root complex 153 to a memory address space 154, such as DRAM or other main memories. Root complex 153 may be integrated with CPU 152 or may be a discreet component. An application program may be stored to memory address space 154 for execution by components of host 150. Host 150 includes a bus 156, such as a storage device interface, which interacts with a host interface 101 of NVM device 102. Bus 156 and host interface 101 operate under a communication protocol 118, 120 such as a Peripheral Component Interconnect Express (PCIe) serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE) and other suitable serial communication protocols.

In the PCIe communication protocol, host 150 sends commands as transaction packets (TLPs). A TLP includes an address field specifying that the read or write information being sought is located in NVM 106 of NVM device 102. The TLP may include other fields such as an Fmt field, Type field, TC field, TD field, CRC, Length field, Requester ID field, Tag field, and other fields. Controller 110 may use the address field to access the data at the location specified.

NVM 106 of NVM device 102 may be configured for long-term storage of information as non-volatile memory space and retains information after power on/off cycles. NVM 106 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in NVM device 102. Each platter may contain one or more regions of one or more tracks of data. NVM 106 may include one or more types of non-volatile memory.

Controller 110 manages operations of non-volatile memory device 102, such as writes to and reads from NVM 106. Controller 110 may include one or more processors 130, which may be multi-core processors. Processor 130 handles the components of NVM device 102 through firmware code. Controller 110 interfaces with host 150 through host interface 101 which may include mac and phy components. Host interface 101 interfaces with NVM 106 through a NVM interface 114.

Controller 110 may operate under NVM Express (NVMe) protocol, but other protocols are applicable. NVMe is a communications interface/protocol developed for SSDs to operate over a host and storage device linked over a PCIe interface. The interface provides a command queue and completion path for SSDs, such as SSDs having NVM 106 of NAND flash memory. NVMe includes support for enterprise capabilities, such as end-to-end data protection, enhanced error reporting, and virtualization.

Controller 110 also includes volatile memory 112 or cache buffer(s) for short-term storage or temporary memory during operation of NVM device 102. Volatile memory 112 does not retain stored data if powered off. Examples of volatile memories include random access memories (RAM), dynamic random access memories (DRAM), static random access memories (SRAM), and other forms of volatile memories.

Controller 110 executes computer-readable program code (e.g., software or firmware) executable instructions (herein referred to as "instructions"). The instructions may be executed by various components of controller 110, such as processor 130, logic gates, switches, application specific integrated circuits (ASICs), programmable logic controllers, embedded microcontrollers, and other components of controller 110.

The instructions are stored in a non-transitory computer readable storage medium. In certain embodiments, the instructions are stored in a non-transitory computer readable storage medium of NVM device 102, such as in read-only memory (ROM) 113 or NVM 106. Instructions stored in NVM device 102 may be executed without added input or directions from host 150. In other embodiments, the instructions are transmitted from host 150. The stored instructions may be stored in full or in part into volatile memory 112 of controller 110 for execution by controller. The controller 110 is configured with hardware and instructions to perform the various functions described herein and shown in the figures.

NVM device 102 may also be connected to host 150 through a switch or a bridge. System 100 may also include a peripheral device 190, such as a camera, connected to bus 156 of host 150 or connected to host 150 through a switch or a bridge. System 100 may also include second host (not shown) connected to host 150 through a switch or a bridge.

Figure 1B:
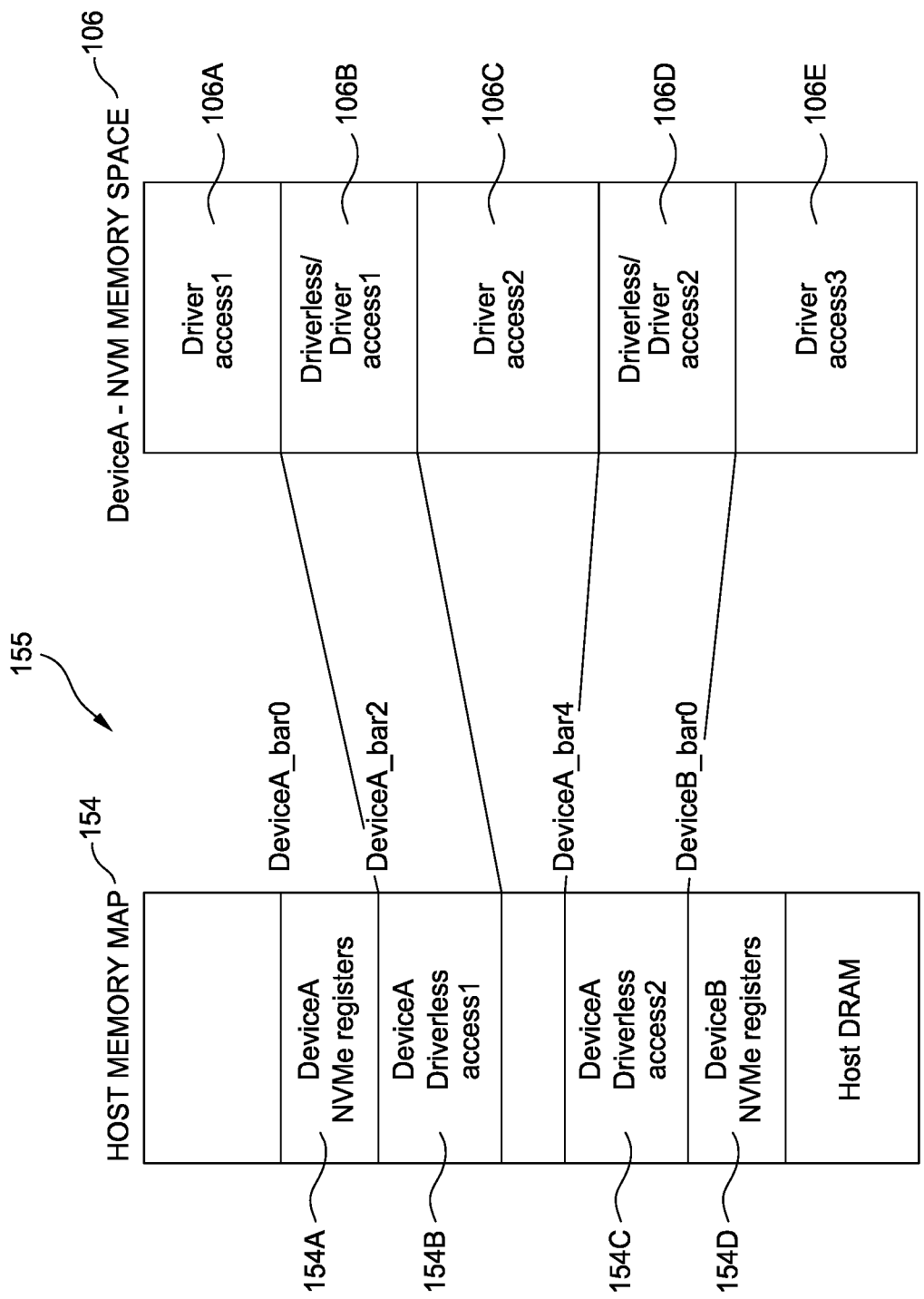
FIG. 1B is a schematic diagram of one embodiment of a memory map of memory address space of a host and a non-volatile memory of a non-volatile memory device.

FIG. 1B is a schematic diagram of a memory map 155 of memory address space 154 of host 150 and NVM 106 of NVM device 102 of FIG. 1A. Memory map 155 is described in reference to system 100, but other systems may be applicable. The memory map 155 shows both driverless access mode and driver access mode of NVM 106 of NVM device 102 established by host 150.

In driver access mode, host 150 may activate one BAR 124 of NVM device 102 implemented in a PCIe configuration space corresponding to DeviceA_bar0. The PCIe configuration space stores configuration information of NVM device 102. Host 150 accesses the configuration information of NVM device 102 to implement driver access through NVMe driver layers of host 150 and NVM device 102 to access NVM portions 106A through 106E of NVM device 102.

In driverless access mode, host 150 may activate another BAR 124 of NVM device 102 implemented in PCIe memory space or virtual memory space corresponding to DeviceA_bar2. Host 150 maps the internal registers of NVM portion 106B to memory address space 154B of host 150. Host 150 may directly read and write to the addresses of memory address space 154B in which the PCIe communication protocol automatically conveys the read and write commands to NVM device 102. Host 150 may activate additional BARs 124 of NVM device 102 in driverless access mode to provide access to another portion of NVM 106 of NVM device 102. For example, host may activate an additional BAR 124 of NVM implemented in a PCIe memory space corresponding to DeviceA_bar4 to map the internal registers of NVM portion 106D to memory address space 154C of host 150.

Host 150 may establish driverless access and/or driver access to a second device, such as a peripheral device or a second NVM device. For example, a second PCIe device may activate a BAR implemented in a PCIe configuration space corresponding to DeviceB_bar0 to provide driver access to the second PCIe device.

Figure 2:
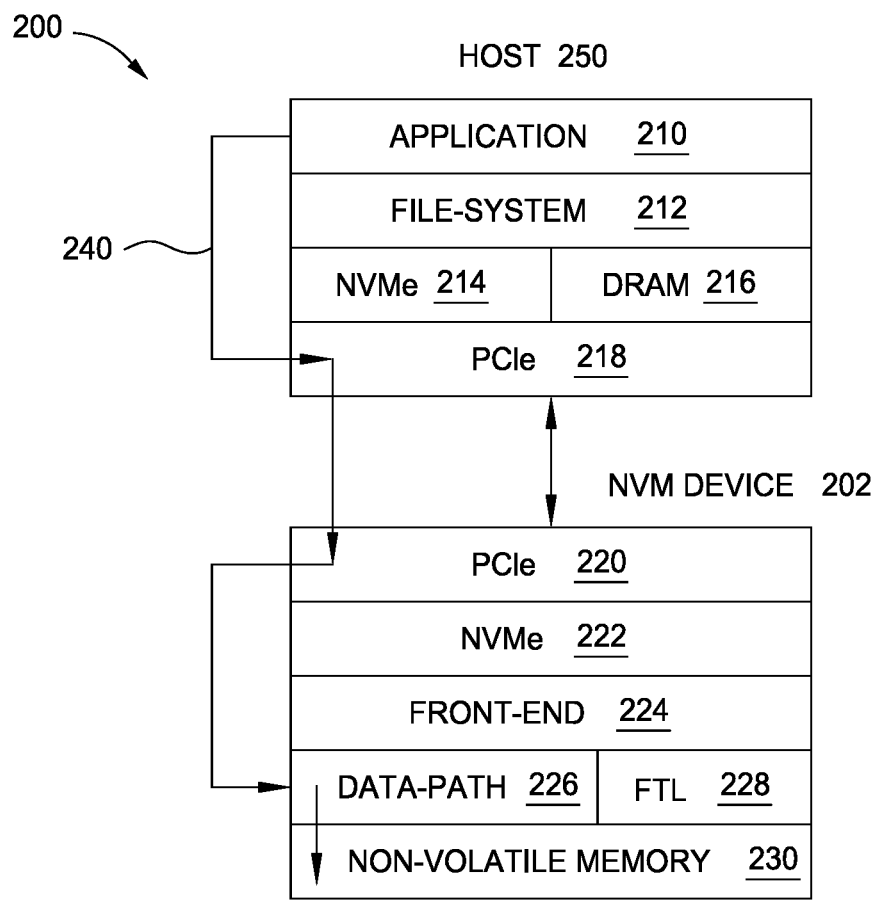
FIG. 2 is a schematic diagram illustrating one embodiment of driver access and driverless access to a non-volatile memory of a non-volatile memory device.

FIG. 2 is a schematic diagram illustrating one embodiment of NVMe-based host access 200 or driver access to NVM 230 of NVM device 202 described in reference to system 100 of FIG. 1, but other systems may be applicable. NVMe-based host access 200 includes host 250 managing NVM device 202 by commands initiated by an application 210 of host 250. Application 210 of host 250 sends a command, such as a read or a write command, to a file-system layer 212 of host 250. File-system layer 212 passes the command to an NVMe device driver 214 of host 250. NVMe device driver 214 may load and store queue messages from and to DRAM 216 of host 250. NVMe driver 214 passes the read/write command to a PCIe layer 218 of host 250 operating under the PCIe communication protocol.

PCIe layer 220 of NVM device 202 receives the command from host 250 and passes the command to an NVMe layer 222 of NVM device 202. NVMe layer 222 translates the command into NVMe protocol and passes the command to a front-end layer 224 of NVM device 202. Front-end layer 224 of NVM device 202 may include cache management and coherency management of NVM 230 of NVM device 202. Front-end layer 224 passes the read/write command to a data-path layer 226 of NVM device 202. Data-path layer 226 accesses a flash translation layer (FTL) module 228 to determine physical addresses associated with the logical addresses of the command. Data-path layer 226 accesses a NVM 230 to read or write the data associated with the command. Data-path layer 226 receives commands from front-end layer 224 and address information from FTL module 228 to initiate read/write operations to NVM 230. In sum, when application 210 provides a NVMe-based access command to NVM device 202, the command passes from application 210 to file-system layer 212 to NVMe driver 214 to PCIe layer 218 of host to PCIe layer 220 of NVM device to NVMe layer 222 to front end to data-path layer 226 accessing FTL module 228 to NVM 230.

FIG. 2 also illustrates one embodiment of a driverless access route 240 to NVM 230 in which NVM 230 is mapped to a memory space of host 250. For example, application 210 of host 250 passes a driverless access command to PCIe layer 218 of host 250. PCIe layer 220 of NVM device 202 receives the driverless access command from host 250 and passes the driverless access command to data-path layer 226 of NVM device 202. Data-path layer 226 module initiates read/write operations to NVM 230. In sum, when application 210 provides a driverless access command to NVM device 202, the command passes from application 210 to PCIe layer 218 of host to PCIe layer 220 of NVM device to data-path layer 226 to NVM 230.

In driverless access route 240, controller 110 is instructed to bypass the NVMe file-system tables and to treat a BAR as a virtual-to-physical address mapping. For example, a BAR corresponding to a physical portion of NVM 230 may be dynamically mapped to logical block addresses. The PCIe protocol enables mapping LBA ranges to its own virtual memory address space and allowing driverless access to these LBAs using PCIe transactions—thus bypassing the NVMe layer. The PCIe protocol is used to bypass the NVMe layer by mapping a specific LBA range and then directly addressing those LBAs through the PCIe layer. Host 250 may directly access this address space via the PCIe and read to and write to this address space.

In certain embodiments in driverless access route 240, controller 110 may aggregate or bind a plurality of driverless access request into a burst operation to NVM interface 114.

The plurality of driverless access commands may be aggregated in volatile memory 112. NVM interface 114 may execute the burst operation as a single request to NVM 106. For NVM 106 comprising NAND flash, a burst operation may increase performance since an idle time of the NAND flash dies may be reduced.

In certain aspects, the PCIe translates NVM 230 in NVM device 202 into a memory aperture exposing the memory aperture to a memory address space in host 250. The PCIe protocol maps the memory aperture to a memory address space on host 250. NVM 230 may appear as simple memory to CPU 152 reducing submission and completion latency and increasing effective bandwidth utilization.

In certain embodiments, the serial PCIe is used to dynamically map a allocated portion of physical memory to a virtual address space in the host device. For instance, in embodiments where systems operate under the PCIe protocol or any one of its derivatives, devices can be mapped to host memory address space via a BAR.

In driverless access mode, a portion of the NVM 230 is mapped into the memory space of host 250 for a certain period of time. The portion of the NVM 230 allocated may be a subset of the NVM 230 to reduce complexity. Driverless access route 240 may include cooperation with FTL module 228 in which data-path layer 226 accesses FTL module 228 for address translation. In other embodiments, driverless access route 240 may include bypassing of FTL module 228. By bypassing FTL module 228 of NVM device 202, host 250 directly manages NVM 230, such as by performing and managing address translation.

Mapping of the physical addresses to a virtual address space of application 210 provides driverless access into a specific address range through load/store memory transactions of a CPU rather than through read/write regular host transactions. Load/store memory transaction instead of being routed to DRAM 216 are routed to NVM device 102. Driverless access to NVM 230 reduces the latency between host 250 and NVM device 202 by bypassing NVMe driver 214 of host 250 and NVMe layer 222 of NVM device 202.

Figure 3:
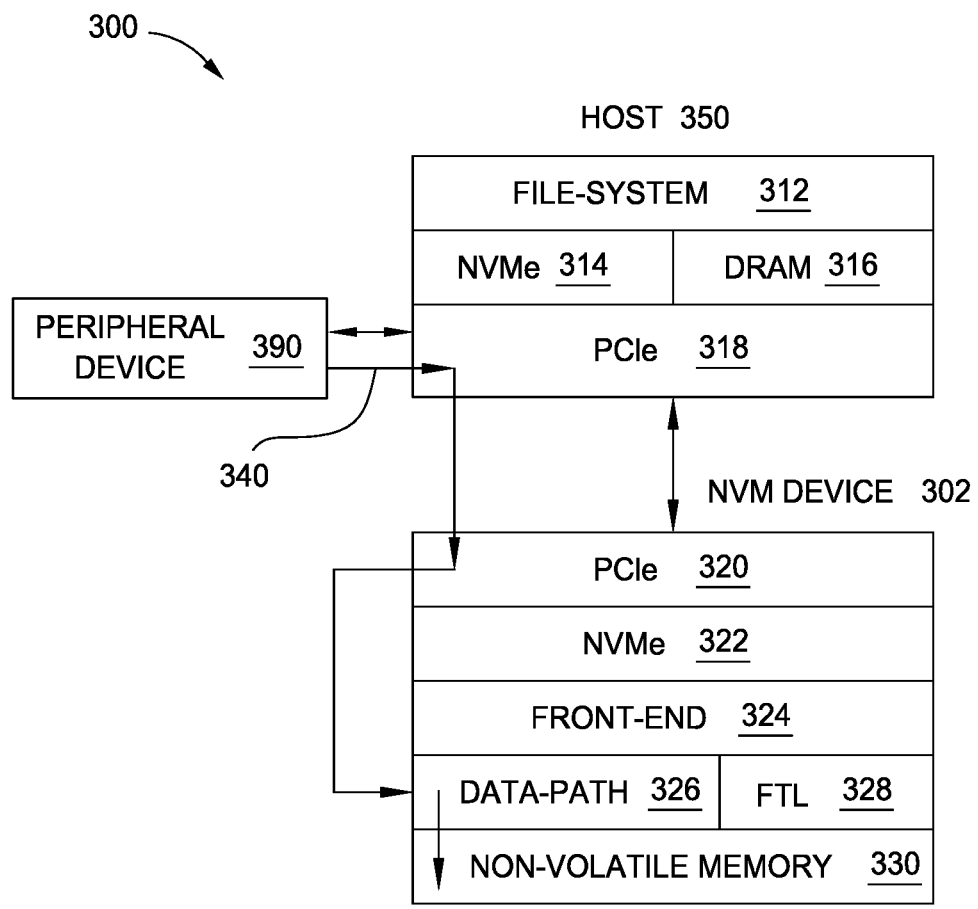
FIG. 3 is a schematic diagram illustrating one embodiment of driver access and driverless access of a peripheral device to a non-volatile memory of a non-volatile memory device.

FIG. 3 is a schematic diagram illustrating one embodiment of NVMe-based host access 300 or driver access of a peripheral device 390, such as a camera, to NVM 330 of NVM device 302 described in reference to the system of FIG. 1, but other systems are applicable. For example, peripheral device 390, such as a PCIe peripheral device, may provide data to be written to a DRAM 316. DRAM 316 sends the data to a file-system layer 312. File-system layer 312 passes the data to a NVMe driver 314 of host 350. NVMe driver 314 passes the data to PCIe layer 318 of host 350. PCIe layer 320 of NVM device 302 receives the data from host 350 and passes the data to a NVMe layer 322 of NVM device 302. NVMe layer 322 passes the data to a front-end layer 324 of NVM device 302. Front-end layer 324 of NVM device 302 passes the data to a data-path layer 326 of NVM device 302. Data-path layer 326 accesses a FTL module 328 to determine physical block addresses associated with the logical addresses of the data. Data-path layer 326 accesses a NVM 330 to write the data to NVM 330. In sum, when peripheral device 390 provides a NVMe-based access to NVM 330, the data passes from peripheral device 390 to DRAM 316 to file-system layer 312 to NVMe driver 314 to PCIe layer 318 of host to PCIe layer 320 of NVM device to NVMe layer 322 to front end layer 324 to data-path layer 326 accessing FTL module 328 to NVM 330.

FIG. 3 also illustrates one embodiment of a writing path of a driverless access route 340 to NVM 330. In one embodiment of a writing path of a driverless access route 340, peripheral device provides data to be written to PCIe layer 318 of host 350. PCIe layer 320 of NVM device 302 receives the data from host 350 and passes the data to data-path layer 326 of NVM device 302. Data-path layer 326 accesses NVM 330 to write the data to NVM 330. In sum, when peripheral device 390 provides a driverless write data to NVM 330, the data passes from peripheral device 390 to PCIe layer 318 to PCIe layer 320 of NVM device 302 to data-path layer 326 to NVM 330.

A much shorter PCIe-to-PCIe route is enabled by driverless access route 340. In driverless access route 340, controller 110 is instructed to bypass the NVMe file-system tables and to treat an allocated BAR as a virtual-to-physical address mapping. The PCIe protocol enables mapping LBA ranges to its own virtual memory address space and allowing direct access to these LBAs using PCIe transactions—thus bypassing the NVMe layer. The PCIe protocol is used to bypass the NVMe layer by mapping a specific LBA range and then directly addressing those LBAs through the PCIe layer. Host 350 may directly access this address space via the PCIe and read to and write to this address space.

In certain embodiments in driverless access route 340, controller 110 may aggregate or bind a plurality of driverless access request into a burst operation to NVM interface 114. The plurality of driverless access commands may be aggregated in volatile memory 112. NVM interface 114 may execute the burst operation as a single request to NVM device 102. For NVM device 102 comprising NAND flash, a burst operation may increase performance since an idle time of the NAND flash dies may be reduced.

Driverless access route 340 may include cooperation with FTL module 328 in which data-path layer 326 accesses FTL module 328 for address translation. In other embodiments, driverless access route 340 may include bypassing of FTL module 328. By bypassing FTL module 328 of NVM device 302, host 350 directly manages NVM 330, such as by performing and managing address translation.

Mapping of the physical addresses to a virtual address space allocated to peripheral device 390 provides driverless access into a specific address range through load/store memory transactions of CPU rather than through read/write regular host transactions. Driverless access to NVM 330 reduces the latency between peripheral device 390 and NVM device 302 by bypassing NVMe driver 314 of host 350 and NVMe layer 322 of NVM device 302.

In certain embodiments, host 350 may configure peripheral device 390 to a BAR corresponding to an allocated portion of NVM 106 of NVM device 102, such a writing configuration commands to a PCIe controller of host 350 and/or NVM device 302. In certain embodiments, the allocated BAR memory may be accessed by peripheral device 390 (or a second host) without involving an operating system of host 350, such as by accessing the allocated BAR memory through the firmware or other components of host 350.

In certain aspects, driverless access route 340 avoids routing data, such as data to be written, to be buffered in DRAM 316 and then routed to file-system layer 312, NVMe driver 314, and then PCIE layer 318. If a BAR allocation is made, then data may be directly routed to NVM 330 of NVM device 302 through the memory aperture.

In certain aspects, driverless access route 340 provides improved performance for sequential writing of data from peripheral device 390, such as a camera, into NVM 330 of NVM device 302. For example, sequential writing of data may comprise large amount of data that is written to a sequential pattern of pages of NVM 330. Driverless access route 340 may provide a low latency, high bandwidth access to NVM 330 by bypassing the communication protocol, such as NVMe, and other layers in host 350 and in NVM device 302.

Driverless access route 340 may also be used for in-place-code execution of code stored on peripheral device 390. For example, in NVMe-based host access 300, peripheral device 390 may provide commands to be executed to the DRAM 316. DRAM 316 sends the commands to be executed to a file-system layer 312. File-system layer 312 passes the commands to be executed to NVMe driver 314 of host 350. NVMe driver 314 passes the commands to be executed to PCIe layer 318 of host 350. PCIe layer 320 of NVM device 302 receives the commands to be executed from host 350 and passes the commands to be executed to NVMe layer 322 of NVM device 302 for execution.

In driverless access route 340, peripheral device 390 may provide commands to be executed from code stored on peripheral device 390 to PCIe layer 318 of host 350. PCIe layer 318 directly sends the commands to be executed to PCIe layer 320 of NVM device 302. PCIe layer 320 of NVM device 302 executes the commands. Driverless access route 340 allows directly executing the commands from code stored on peripheral device 390 and avoids storing the code to DRAM 316 of host 350 as well as bypassing other layers of host 350 and NVM device 302. Therefore, driverless access route 340 may provide low latency execution of code stored on peripheral device 390.

Figure 4:
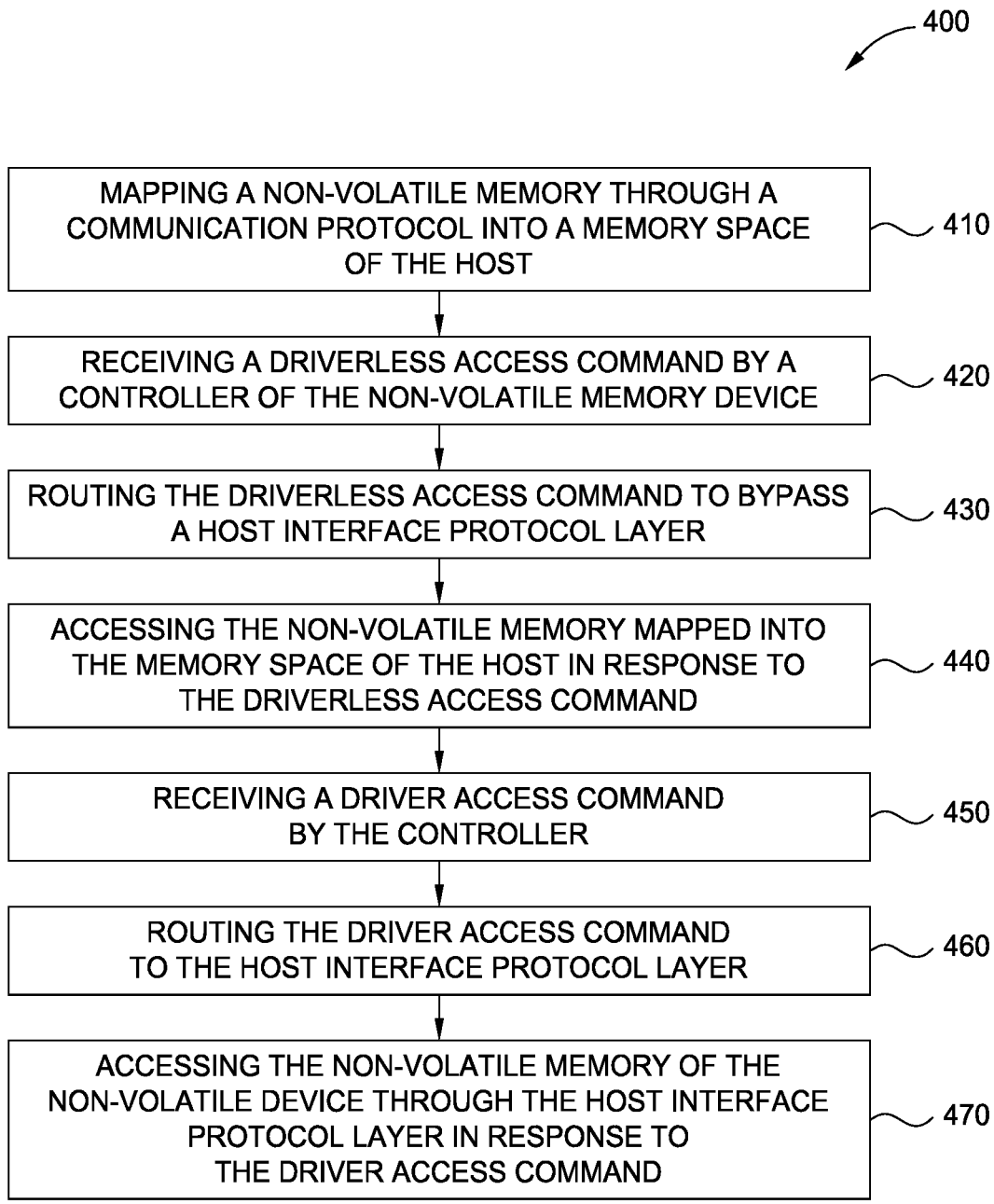
FIG. 4 is a schematic diagram illustrating one embodiment of a writing path of a driverless access of a non-volatile memory of a non-volatile memory device by a host.

FIG. 4 is a schematic diagram illustrating one embodiment of a method 400 of accessing NVM 106 of NVM device 102 by host 150 described in reference to system 100 of FIG. 1, although other system may be applicable. Method 400 includes accessing NVM 106 of NVM device 102 by host 150 in both driver access mode and driverless access mode. One or more blocks of method 400 may be performed by CPU 152, controller 110, or other controllers executing computer-readable program code (e.g., software or firmware) executable instructions stored in NVM device 102 or host 150.

At block 410, a portion of NVM 106 is dynamical mapped by host 150 through a communication protocol, such as through PCIe protocol, into memory address space 154 of host 150. A size of the portion of the NVM may be dynamically allocated by host based upon the requirements or needs of the host. Host 150 may dynamically map NVM 106 into memory address space 154 of host 150 by activating one or more BARs corresponding to various portions of NVM 106 of NVM device 102.

At block 420, a driverless access command is received by controller 110 of NVM device 102. For example, the driverless access command may be received through memory aperture 236 mapping the portion of NVM 106 into memory address space 154.

At block 430, the driverless access command is routed to bypass a host interface protocol layer, such as an NVMe layer.

At block 440, the portion of NVM 106 mapped into memory address space 154 of host 150 is accessed in response to the driverless access command. For example, the portion of NVM 106 mapped into memory address space 154 may be accessed through memory aperture 236. Host 150 and NVM device 102 may align on an alignment size to complete the driverless access command. In certain embodiments, the alignment size may be greater than one byte for NVM programmed and read by multiple bytes, such as when the NVM comprises NAND flash.

Blocks 410, 420, 430, 440 may be repeated to remap another portion of the NVM 106 through the communication protocol into memory address space 154 of host 150. For example, a second BAR may be activated corresponding to another portion of NVM 106. NVM 106 may be remapped through the communication protocol into memory address space 154 of host 150 to change an allocated size of NVM 106.

At block 450, a driver access command by the controller of the non-volatile memory device is received. The driver access command may be through a host interface, such as NVMe interface.

At block 460, the driver access command is routed to the host interface protocol layer. For example, the driver access command is routed to the host interface protocol layer of the host through communication protocol of NVM device 102.

At block 470, another portion of NVM 106 of NVM device 102 through the host interface protocol layer is accessed in response to the driver access command. In one embodiment, two separate portions of NVM may be simultaneously allocated for driverless access at block 440 and for driver access at block 470. For example, one portion of NVM 106 may be is mapped into memory address space 154 of host 150 by activating a BAR corresponding to a portion of NVM 106 of NVM device 102 for driverless access and another portion NVM 106 may be allocated for driver access.

In another embodiment, overlapping portions of NVM 106 may be allocated for driverless access at block 440 and for driver access at block 470. For example, one BAR corresponding to the portion of NVM 106 for driverless access may be active while driver access may be inactive. Similarly, one BAR corresponding to the portion of NVM 106 for driverless access may be inactive while driver access may be active.

Method 400 provides both driverless access and driver access to NVM device 102 using the same communication protocol, such as a PCIe communication protocol. NVM device 102 over the same communication protocol may complete driverless access commands and driver access commands at the same time using different LBA ranges. NVM device 102 over the same communication protocol may complete driverless access commands and driver access commands at the different times using overlapping LBA ranges.

In certain embodiments, driver access may be NVMe-based access over PCIe. In certain embodiments, driverless access may be accomplished by mapping of NVM 106 by a PCIe BAR, such as PCIe BAR4, to memory address space 154 of host 150. Host 150 may queue NVMe commands while also sending load/store direct access commands to PCIe BAR mapped to NVM 106.

Host 150 or peripheral device 190 may use driverless access to reduce latency. Driverless access may be used to reduce latency for sequential data writes/reads to NVM 106 since buffering of the accessed data may be avoided. Driverless access may be used to reduce latency for any type of data, sequential or random, since NVMe layers and other layers are bypassed in host 150 and in NVM device 102. Method 400 may apply to any access commands, such as a single access command or multiple access commands, of NVM 106 of NVM device 102.

Figure 5:
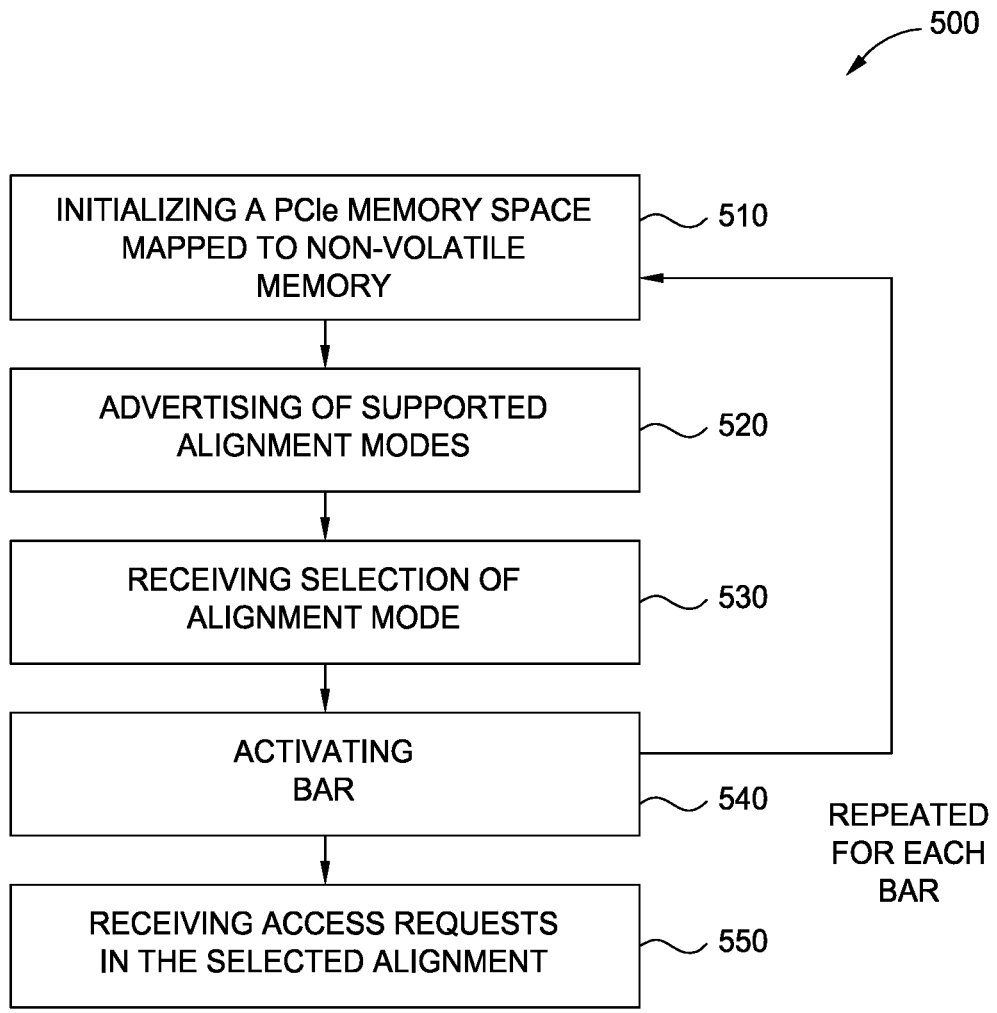
FIG. 5 is a schematic diagram illustrating one embodiment of a method of operating NVM device in a driverless access mode

FIG. 5 is a schematic diagram illustrating one embodiment of a method 500 of operating NVM device 102 in a driverless access mode described in reference to system 100 of FIG. 1, although other NVM devices may be applicable. One or more blocks of method 500 may be performed by controller 110 executing computer-readable program code (e.g., software or firmware) executable instructions stored in NVM device 102 or host 150.

At block 510, a PCIe memory space is initialized mapping a portion of NVM 106 of the NVM device 102 to host memory space 154. Mapping is conducted through a PCIe link between host 150 and NVM device 102.

At block 520, available or preferred alignment modes are advertised or transmitted by NVM device 102. The alignment size may be negotiated before or after activating a BAR. NVM device 102 may advertise a list of preferred alignment modes. Since byte access is non-optimal to NVM 106 for embodiments in which the NVM is programmed and read by a plurality of bytes, NVM device 102 may align on an alignment size. For example, NVM device 102 may transmit or advertise a preferred alignment size of 64 bytes or larger, such as the size of one page or more of NAND memory. NVM device 102 may further provide a list of other alignment parameters supported.

At block 530, an alignment selection of an alignment size is received by NVM device 102. The alignment selection is from host 150 or peripheral device 190 connected to host 150. After negotiation of an alignment size, transaction packets are transmitted in the alignment size or multiples of the alignment size to complete the driverless access commands.

NVM device 102 may receive an alignment mode selection of other alignment parameters. Driverless access mode may be established as part of this negotiation. For example, NVM device 102 may be aligned with host 150 in dynamic alignment in which the alignment size varies according to the requirements or needs of host 150. For example, one or more driverless access commands are conducted in one alignment size and one or more other driverless access commands are conducted in another alignment size. In other embodiments, NVM device 102 may be aligned with host 150 in static alignment in which each driverless access command is conducted in the same alignment size (i.e., transaction packets transmitted in the alignment size or multiples of the alignment size).

If an alignment selection is not received by NVM device 102 after a time-out period, driverless access mode may be established in a default alignment size. In other embodiments, blocks 520 and 530 may be skipped with driverless access mode established in a default alignment size.

At block 540, a BAR corresponding to a portion of NVM 106 of NVM device 102 is activated. After the BAR is activated, transaction packets are transmitted by host 150 and NVM device 102 in the alignment size or multiples of the alignment size. The transaction packets addressed to the logical address of host memory space 154 will be sent to NVM device 102 bypassing the NVMe layer of the NVM device 102. The BAR may be deactivated to provide driver access to the same portion of NVM 106 of NVM device 102. Blocks 510, 520, 530, and 540 may be repeated to activate other BARs 124 of NVM device 102. Blocks 510, 520, 530, and 540 may be repeated to re-established driverless access mode to a BAR with a different size of NVM 106 of the NVM device 102 and/or different alignment size.

At block 550, NVM device 102 receives access requests in the aligned alignment size or default alignment size to the activated BARs in driverless access mode.

In certain aspects of method 500, NVM device 102 negotiates and aligns with host 150 or peripheral device 190 on the access alignment size. NVM device 102 can provide driverless access in a non-byte (more than one byte) resolution to host 150 or peripheral device 190. For example, for NVM 106 made of NAND flash, single byte or a few byte transaction size is difficult to support since several bytes are program and read by page of NAND flash array. Host 150 or peripheral device 190 may choose which access alignment size based upon performance or application requirements. In certain aspects, driverless memory access allows working with dynamic read/write alignment sizes. By reviewing host planned operations, the pipeline between host 150 and NVM device 102 may be configured to increase performance by selectively using of driverless access to memory aperture 236.

In certain aspects, reduced latency may be achieved for host 150, for NVM device 102, or for both host 150 and NVM device 102. Bypassing NVMe driver 214, 314 of host 250, 350 and NVMe layer 222, 322 of NVM device 202, 302 may provide reduced latency for host 150 and/or NVM device 302. Along with reduced latency, increased throughput of data access writes/reads may be achieved. Along with reduced latency, reduced power consumption by host 150 and/or NVM device 102 may be achieved.

In certain aspects, quality of service (QoS) levels or input/output operations per seconds (IOPS) levels during mapping may be determined. For example, a portion or all of NVM 106 of NVM device 102 may be mapped to memory address space 154 of host 150 to provide a flexible QoS or IOPS levels. Host 150 may communicate to allocate resources under agreed to or certain parameters. In certain embodiments, if low latency is desired, then a large portion of NVM 106 may be allocated to driverless access mode. In certain embodiments, portions of NVM 106 may be allocated dynamically for driverless access in an as-needed basis. For example, a BAR mapping a portion of NVM 106 may be un-mapped and re-mapped dynamically to adjust the amount of storage space needed by host 150.

In certain embodiments, host 150 send driverless commands to the NAND flash by sending commands through memory aperture 236 bypassing several hardware and firmware components to perform debug operations and isolate errors in NVM 106 of NVM device 102. Driverless access of NVM 106, such as driverless access of a NAND flash die, may reduce debug effort by focusing on the critical component of NVM 106 and bypassing physical links and circuitry connecting host 150 and NVM 106.

In certain embodiments, NVM device 102 may be accessed on a dynamic basis (i.e., the same NVM device may provide driver access mode and driverless access mode at the same time). Both modes may operate in parallel, for example, a BAR for one portion of NVM 106 of NVM device 102 may be allocated for driverless access and another portion of NVM 106 of NVM device 102 may be allocated to driver access. In other words, driverless access and driver access may be accessing different physical addresses of NVM 106 of NVM device 102.

In certain embodiments, driverless access to NVM 106 of NVM device 102 may be through load/storage commands received from host 150 and driver access may be through read/write commands received from host 150.

In certain embodiments, NVM 106 appears as a memory to CPU 152 in driverless access mode. In optional embodiments, communication protocols for driverless access mode may be performed by an intermediate controller. Intermediate controller may optionally perform error checking, buffering of incoming commands, and/or wear leveling. Driverless access may be performed on any system 100 operating under a communication protocol to reduce submission and completion latency and increases effective bandwidth utilization.

Bypassing one or more components of the chipset of host 150 may reduce an amount of time to transfer the data between host 150 and NVM device 102 as compared to routing the data via the application processor and/or the main memory (i.e., DRAM) of the chipset. By bypassing one or more components of the chipset during the transfer of the data, a power consumption of the chipset may be reduced.

In some embodiments, communication between host 150 and NVM device 102 may pass through several electrical links, each connected by an interconnect switch or by a protocol bridge adaptor. In such embodiments, communication along each link may be negotiated according to a different protocol. For instance, a command placed in command queue may be routed through a PCIe root port, switch to a computer-networking communications standard link via a network adaptor, and then switch back to PCIe before arriving at NVM device 102.

In certain aspects, providing driverless access to NVM 106 of NVM device 102 in the embodiments described herein, other driverless access through the PCIe protocol, other direct access through the PCIe protocol, or other direct access through other communication protocols (collectively referred to as "direct access") may make the NVM device 102 vulnerable to security violations. Direct access may reduce the effectiveness of standard security protection tools which are operated at the host level. For example, in a direct access mode established between host 150 and NVM device 102, an unauthorized or hacking device or program may bypass permissions, NVMe security protocols, and other security layers. A hacking device or program may identify that NVM device 102 is in direct access mode with host 150 and may attempt to establish its own access with NVM device 102 through a mapped memory aperture of NVM 106 into memory address space 154 of host 150. A hacking device or program may take control of the mapped portions of NVM 106. A hacking device or program with access to NVM device 102 through a memory aperture may have undesired read and write access to critical areas, such as system files, boot files, passwords, management tables, firmware, and erased/invalid data. Such security violations may be difficult to detect.

Figure 6:
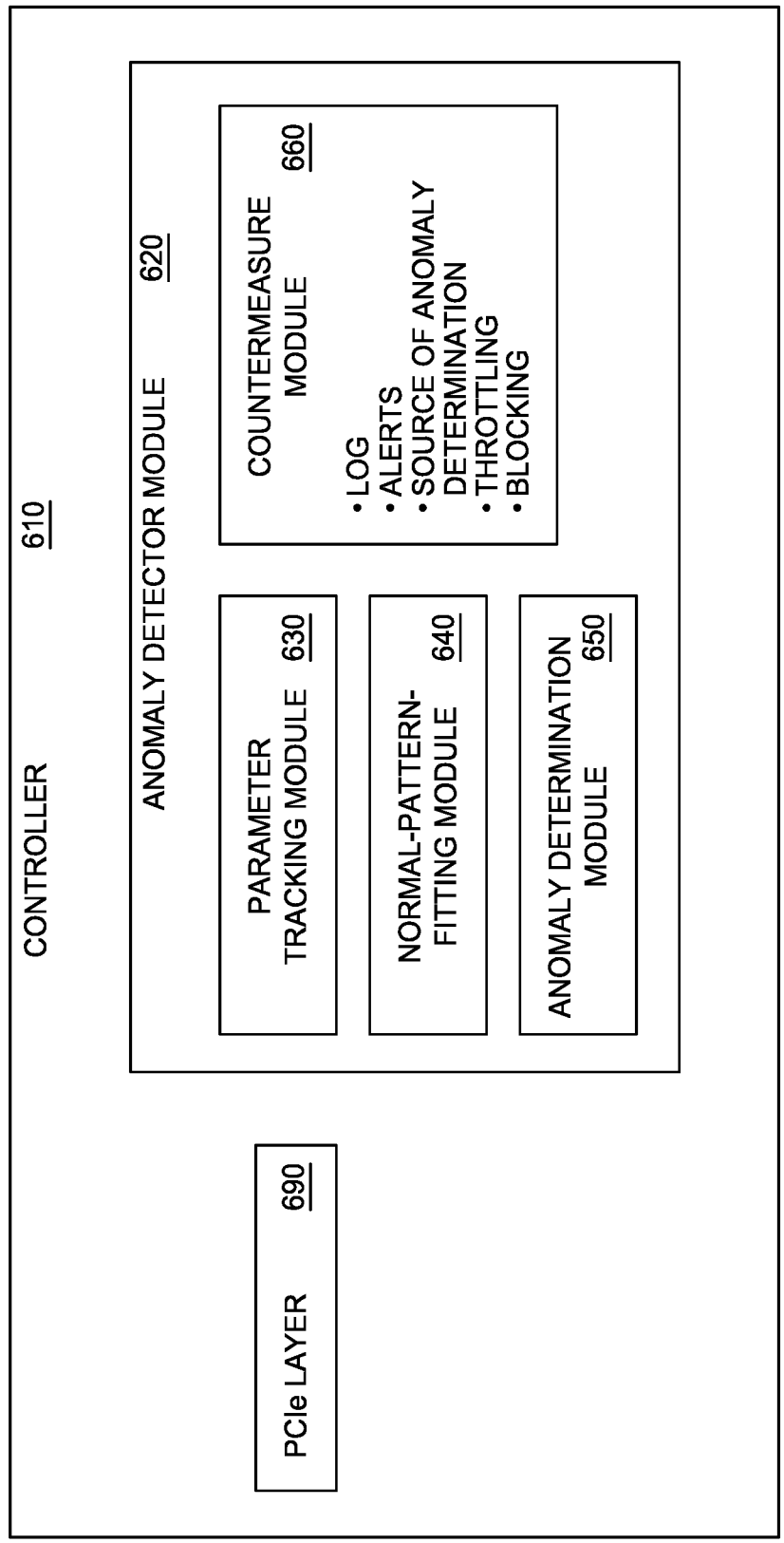
FIG. 6 is a schematic diagram of one embodiment of a controller of a non-volatile memory device having an anomaly detector module.

FIG. 6 is a schematic diagram of one embodiment of a controller 610 of a NVM device having an anomaly detector module 620. The controller 610 may be implemented in NVM device 102 of FIG. 1, although other NVM devices may be applicable.

Figure 7:
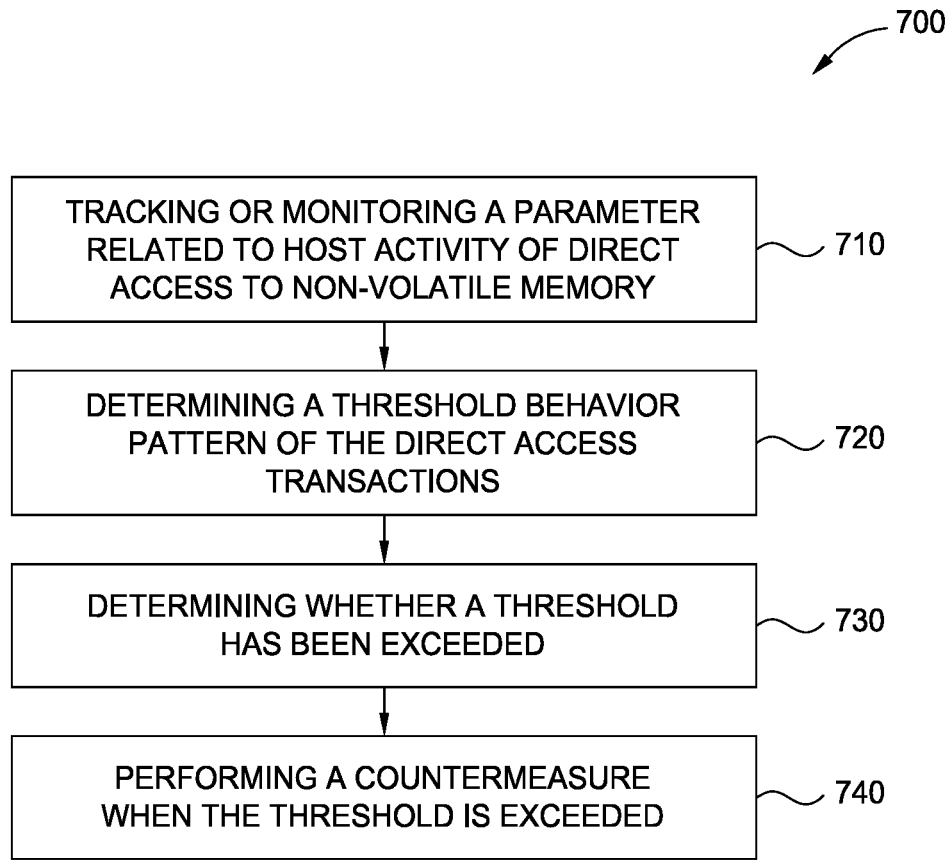
FIG. 7 is a schematic diagram illustrating one embodiment of a method of operating a non-volatile memory device in direct access mode and detecting potential security violations.

FIG. 7 is a schematic diagram illustrating one embodiment of a method 700 of operating a NVM device by controller 610 of FIG. 6, although other NVM devices may be applicable. Method 700 includes providing access to NVM 106 of NVM device 102 in direct access mode and detecting potential security violations. Method 700 is described in reference to system 100 and controller 610, but other systems and controllers may be used. One or more blocks of method 700 may be performed by controller 610 executing computer-readable program code (e.g., software or firmware) executable instructions stored in NVM device 102.

At block 710, a parameter tracking module 630 of controller 610, tracks or monitors one or more parameters related to direct access commands by host 150. One possible parameter includes logical block addresses accessed (i.e., the start LBA address and the end LBA address) in a direct access transaction. Another possible parameter includes a timing of a direct access command (i.e., when the direct access transactions occur). Another possible parameter includes a size of the data accessed in a direct access transaction. Another possible parameter include a source of a direct access transaction (i.e., is the source of the command from host 150 or from peripheral device 190). Another possible parameter includes a type of access command (i.e., read access, write access). Other parameters tracked or monitored are possible. In other embodiments, NVM device 102 may track the contents of data programmed or read in a direct access transaction. For example, NVM device 102 may track a pattern of zeros written, the pattern of ones written, and/or the ratio of zeros to ones written in a direct access transaction.

The one or more parameters are tracked from a PCIe layer 690 of controller 610 providing a direct access to NVM 106. Tracking or monitoring of direct access transactions of host 150 may comprise tracking or monitoring all direct access transactions or may comprise tracking or monitoring a sample or a portion of direct access transactions. In certain embodiments, multiple transactions may be tracked or monitored to create a history of the transactions. For each transaction of the multiple transactions tracked or monitored, one or more parameters may be tracked or monitored. A rate of change of one or more parameters may be determined over the course of multiple transactions. For example, a rate at which certain logical block addresses are accessed may be tracked or monitored.

At block 720, a normal-pattern-fitting module 640 of controller 610 determines a threshold for a normal behavior pattern. The threshold for a normal behavior pattern may be determined by the one or more parameters tracked at block 710, by contents of accessed data tracked at block 710, by data accumulated at performance testing, and/or by off-line settings. The threshold for a normal behavior pattern may be updated as new information is accumulated from block 710. In one aspect, NVM device 102 determines a pattern of the parameters gathered at block 710 or the statistics or probability of a transaction or a parameter of a transaction occurring.

In one embodiment, block 720 may be conducted online as NVM device 102 is in operation. In another embodiment, a threshold behavior pattern may be set by a user mode page as NVM device 102 is in operation. In another embodiment, block 720 may be conducted offline, such as during qualification of NVM device 102. For example, a lookup table or a dictionary of a normal behavior may be created offline and uploaded to NVM device 102.

At block 730, an anomaly determination module 650 of controller 110 determines whether a threshold for a normal behavior pattern has been exceeded for the threshold behavior pattern determined at block 720. For example, anomaly determination module 650 determines if a transaction is an outlier to the pattern determined at block 720. In certain embodiments, determining whether a threshold for a normal behavior pattern has been exceeded may by based on one or more of the following categories of techniques: an unsupervised learning operation (an operation based upon determining a pattern), an supervised learning operation (an operation based upon a data set example of both normal and abnormal transactions), or a semi-supervised learning operation.

In certain embodiments, determining whether a threshold has been exceed may be based upon one or more of the following techniques: density-based techniques (e.g. k-nearest neighbor, local outlier factor), subspace and correlation-based outlier detection for high-dimensional data, one class support vector machines, replicator neural networks, cluster analysis-based outlier detection, deviations from association rules and frequent item sets, fuzzy logic based outlier detection, and ensemble techniques (i.e., using feature bagging, score normalization, different sources of diversity, etc.). For example, an excess number of read/writes to a small portion of an address space may indicate suspicious direct access transactions. In another example, a pattern of multiple read transactions with isolated write transactions may indicate suspicious direct access transactions.

At block 740, a countermeasure module 660 of controller 610 may perform a countermeasure if the threshold has been determined to be exceeded at block 730. One example of a countermeasure includes providing an alert when a threshold is exceeded or an anomaly is detected. The alert may be sent to host 150. The alert may also include a confidence level of whether the anomaly detected is a low security risk, a medium security risk, or a high security risk. The alert may also enable feedback on whether the host approves or disapproves of the suspicious transaction.

Another example of a countermeasure includes identifying a source of the problematic access command by examination of a source identified through root-complex 153, such as review of the enumeration information. Another example of a countermeasure includes selectively blocking an identified source of the problematic direct access transactions. Another example of a countermeasure includes selectively throttling or delaying access to an identified source of the problematic direct access transactions. Throttling or delayed access may be increased if suspicious direct access commands continue.

Another example of a countermeasure includes creating a log of the alerts or the instances a threshold is exceeded or an anomaly is detected. The log may include one or more parameters tracked at block 710. The log may include a history of the alerts or the instances a threshold is exceeded or an anomaly is detected. The log may include a confidence level of whether the anomaly detected is a low security risk, a medium security risk, or a high security risk. The log may be stored in NVM 106. In one embodiment, host 150 may review the log. In another embodiment, controller 610 may use the log in combination with other countermeasures. For example, following a certain number, rate (i.e., soon one after the other), and/or severity of alerts or instances of a threshold is exceeded or an anomaly is detected, NVM device 102 may increase the severity of the countermeasures. Anomaly detector module 620 may start with any countermeasure and increase to any other countermeasure. For example, anomaly detector module 620 may start with throttling as a countermeasure and then increase the countermeasure to blocking if the anomalies continue or increase.

In certain embodiments, anomaly detection of direct access of NVM 106 of NVM device 102 is provided. Anomaly detection by NVM device 102 may identify potential security violations which cannot or are not identified by host 150. A countermeasure from anomaly detection may be a static action, such as a notification to host 150, or an active action, such as throttling access or blocking access. In certain embodiments, the countermeasure may switch from a static action to an active action if suspicious direct access commands continue.

In certain embodiments, security protections in regards to direct access transactions are provided by NVM device 102. Security protections may include identifying suspicious transactions and may include identifying the source of suspicious direct access commands. Security protections may include implementing countermeasures when suspicious direct access transactions are identified. In certain aspects, these security protections may not be bypassed in direct access mode.

In one embodiment, a method for providing access to a non-volatile memory of a non-volatile memory device comprises receiving a memory request. If the received memory request is a direct access memory request, a host interface protocol layer of the non-volatile memory device is bypassed. If the received memory request is a non-direct access memory request, the non-direct access memory request is sent to the host interface protocol layer. In certain embodiments, the host interface protocol layer is a NVM Express protocol layer. In certain embodiments, the method further includes establishing a PCIe link to a host. In certain embodiments, the method further includes allocating a physical address space within the non-volatile memory for the direct memory request. The physical address space may be determined by a base address register for the non-volatile memory device. The size of the physical address space may be dynamically allocated. The physical address space within the non-volatile memory device may be reallocated for a new memory request. A portion or more of the physical address space may be directly accessed and non-directly accessed by a direct access memory request and a new non-direct access request.

In one embodiment, a method for providing access to a non-volatile memory of a non-volatile memory device includes tracking a parameter related to a plurality of direct access transactions of the non-volatile memory. A threshold behavior pattern of the host activity is determined based upon the tracked parameters. The direct access transactions are reviewed to determine whether the threshold behavior pattern is exceeded. The threshold behavior pattern may be determined through online tracking of a rate of change of the tracked parameter. The threshold behavior pattern may be determined through offline generation of a lookup table. The threshold behavior pattern may be set by a user mode page. The threshold behavior pattern may be determined by analyzing a programmed data from the direct access transaction. The parameter tracked may be LBA addresses accessed, timing of direct access transactions, transaction sizes of the direct access transactions, sources of a direct access transaction, types of access requested in the direction access transactions, or other suitable parameters. A plurality of parameters may be tracked for each direct access transaction. Machine learning may be utilized to determine whether the threshold behavior pattern has been exceeded by one of the direct access transactions.

In another embodiment, a method for providing access to a non-volatile memory of a non-volatile memory device includes monitoring a parameter related to a direct access transaction of the non-volatile memory. The direct access transaction is reviewed to determine whether the threshold behavior pattern is exceeded. A countermeasure to the direct access transaction exceeding the threshold behavior pattern is performed. The countermeasure may include sending an alert that the threshold behavior pattern has been exceeded by the direct access transaction. The alert may include a confidence level that the direct access transaction is a security violation. The countermeasure may further include receiving confirmation whether the direct access transaction is authorized. The countermeasure may include identifying a source of the direct access transaction exceeding the threshold behavior pattern. Direct access provided to the identified source of the direct access transaction exceeding the threshold behavior pattern may be throttled. Direct access provided to the identified source of the direct access transaction exceeding the threshold behavior pattern may be blocked. A severity of the countermeasure may be increased if the threshold behavior pattern continues to be exceeded.

In one embodiment, a non-volatile memory device comprises a controller. A non-volatile memory is coupled to the controller. The controller is operable to provide direct access to the non-volatile memory. The controller includes an anomaly detector module to determine whether a threshold behavior pattern for direct access has been exceeded. The threshold behavior pattern may be determined from monitoring of a parameter of a plurality of direct access transactions. The threshold behavior pattern may be determined from a mode page setting. The threshold behavior pattern may be determined from a look-up table. The threshold behavior pattern may be determined to be exceeded based upon machine learning.

In another embodiment, a non-volatile memory device comprises a controller. The controller comprises an anomaly detector means. A non-volatile memory is coupled to the controller. The controller is operable to provide direct access to the non-volatile memory. The anomaly detector means is operable to detect suspicious direct access transactions. The anomaly detector means may monitor a parameter of the direct access. The anomaly detector means may flag suspicious direct access transactions.

While the foregoing is directed to embodiments of the present disclosure, other and further embodiments of the disclosure may be devised without departing from the basic scope thereof, and the scope thereof is determined by the claims that follow.

What is claimed is:

1. A method of accessing a non-volatile memory (NVM) of a NVM device by a host, the method comprising:
   establishing a first direct peripheral component interconnect express (PCIe) link between a PCIe layer of the host and a PCIe layer of the NVM device and a second direct PCIe link between the PCIe layer of the host and a PCIe layer of a peripheral device;
   initializing a PCIe memory space by a flash translation layer (FTL) of the NVM device, wherein the PCIe memory space connects one or more portions of the NVM of the NVM device to a host memory space through the first direct PCIe link, via the FTL, between the host and the one or more portions of the NVM, wherein the PCIe memory space is a mapping of a physical address of the NVM to a logical block address of the host memory space;
   providing the PCIe memory space to the host to configure the host to access the one or more portions of the NVM using the PCIe memory space; and
   routing data directly from the peripheral device through the second direct PCIe link to the first direct PCIe link by addressing the PCIe memory space, wherein:
      the data is routed to the one or more portions of the NVM using the mapping of the physical address of the NVM to the logical block address of the host memory space provided in the PCIe memory space; and
      address translation by the FTL of the NVM device is bypassed during the routing.

2. The method of claim 1, wherein the routed data bypasses a volatile memory of the host.

3. The method of claim 1, wherein the routed data bypasses a driver layer of the NVM device.

4. The method of claim 1, wherein the data is routed from the peripheral device through the second direct PCIe link and through the first direct PCIe link to a data-path layer of the NVM device.

5. The method of claim 4, wherein the data-path layer performs a sequential write operation of the data to the one or more portions of the NVM.

6. The method of claim 1, wherein the routed data bypasses a NVM express (NVMe) driver of the host.

7. The method of claim 6, wherein the routed data bypasses a NVMe driver of the NVM device.

8. The method of claim 1, further comprising advertising supported alignment modes of the NVM device to the host.

9. The method of claim 1, further comprising:
   receiving a selection of an alignment mode by the host; or
   proceeding in a default alignment mode responsive to an alignment mode selection not being received from the host within a timeout period.

10. A method of accessing a non-volatile memory (NVM) of a NVM device by a host, the method comprising:
    establishing a direct peripheral component interconnect express (PCIe) link between a PCIe layer of a host and a PCIe layer of the NVM device;
    initializing a PCIe memory space by a flash translation layer (FTL) of the NVM device, wherein the PCIe memory space connects one or more portions of the NVM of the NVM device to a host memory space through the direct PCIe link, via the FTL, between the host and the one or more portions of the NVM, wherein the PCIe memory space is a mapping of a physical address of the NVM to a logical block address of the host memory space;
    providing the PCIe memory space to the host to configure the host to access the one or more portions of the NVM using the PCIe memory space; and
    routing data directly from a peripheral device coupled to the host to the one or more portions of the NVM through the direct PCIe link by addressing the PCIe memory space, wherein:
       the data is routed to the one or more portions of the NVM using the mapping of the physical address of the NVM to the logical block address of the host memory space provided in the PCIe memory space; and
       address translation by the FTL of the NVM device is bypassed during the routing.

11. The method of claim 10, further comprising negotiating an alignment size of a minimum transaction packet size to load/store commands with the host.

12. The method of claim 10, further comprising executing load/store commands sequentially.

13. The method of claim 10, further comprising executing load/store commands in parallel to read/write commands in different portions of the NVM.

14. The method of claim 10, further comprising accessing the one or more portions of the NVM of the NVM device through the PCIe layer of the NVM device.

15. The method of claim 10, wherein the routed data is passed from the peripheral device to the PCIe layer of the host and from the PCIe layer of the host to the PCIe layer of the NVM device.

16. The method of claim 15, wherein the routed data is further passed from the PCIe layer of the NVM device to a data path layer of the NVM device and from the data path layer of the NVM device to the one or more portions of the NVM.

17. A computing system, comprising:
    a peripheral device comprising a first peripheral component interconnect express (PCIe) layer;
    a host coupled to the peripheral device, wherein the host comprises a second PCIe layer;

a non-volatile memory (NVM) device coupled to the host, wherein the NVM device comprises a third PCIe layer, an NVM, and a controller, wherein the controller comprises an anomaly detector module;

means for establishing a first direct PCIe link between the second PCIe layer of the host and the third PCIe layer of the NVM device and a second direct PCIe link between the second PCIe layer of the host and the first PCIe layer of the peripheral device;

means for initializing a PCIe memory space by a flash translation layer (FTL) of the NVM device, wherein the PCIe memory space is configured to connect one or more portions of the NVM of the NVM device to a host memory space through the first direct PCIe link, via the FTL, between the host and the one or more portions of the NVM, wherein the PCIe memory space is a mapping of a physical address of the NVM to a logical block address of the host memory space;

means for providing the PCIe memory space to the host to configure the host to access the one or more portions of the NVM using the PCIe memory space; and means for routing data directly from the peripheral device through the second direct PCIe link to the first PCIe link by addressing the PCIe memory space, wherein:

the data is routed to the one or more portions of the NVM using the mapping of the physical address of the NVM to the logical block address of the host memory space provided in the PCIe memory space; and address translation by the FTL of the NVM device is bypassed during the routing.

18. The computing system of claim 17, wherein the anomaly detector module comprises:

a parameter tracking module;
a normal-pattern fitting module; and
an anomaly determination module.

19. The computing system of claim 17, wherein the anomaly detector module comprises a countermeasure module.

20. The computing system of claim 17, further comprising:

means for establishing driver access to the NVM.

* * * * *